Aug. 12, 1952 — J. J. DIGBY — 2,606,449
ENGINE STARTER DRIVE
Filed July 2, 1951

INVENTOR.
James J. Digby

Patented Aug. 12, 1952

2,606,449

UNITED STATES PATENT OFFICE 2,606,449

ENGINE STARTER DRIVE

James J. Digby, Elmira, N. Y., assignor to Bendix Aviation Corporation, a corporation of Delaware Application July 2, 1951, Serial No. 234,716

6 Claims. (Cl. 74—7)

The present invention relates to an engine starter drive, and more particularly to a so-called anti-kickout or "follow through" type drive incorporating an overrunning connection and an overload slip connection.

It is an object of the present invention to provide a starter drive of the above type in which the torque capacity of the slip connection is controlled by the traversing means for the starter pinion.

It is another object to provide such a device incorporating a positive means for predetermining the maximum torque capacity of the slip connection.

Further objects and advantages will be apparent from the following description taken in connection with the accompanying drawing in which.

Figure 1:
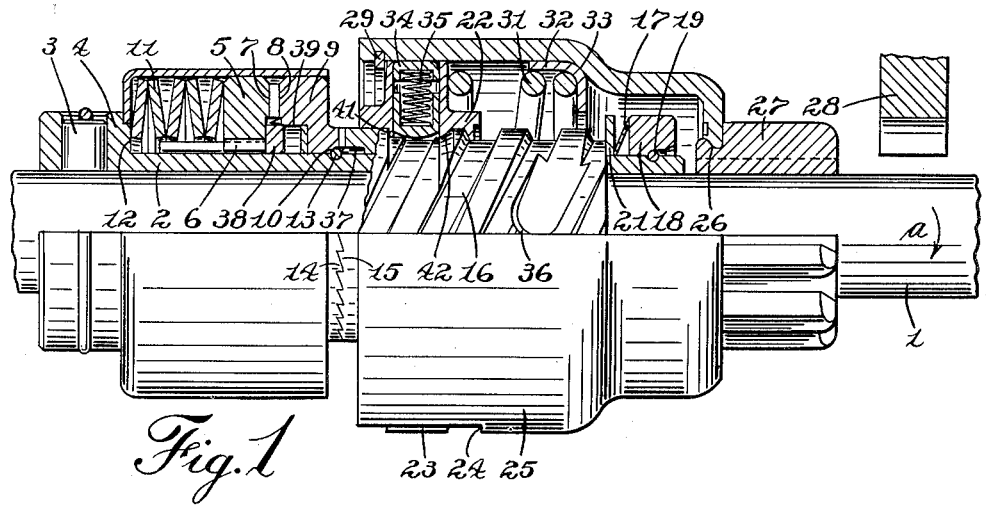
Fig. 1 is a side elevation partly in section of a preferred embodiment of the invention.

In Fig. 1 of the drawing there is illustrated a power shaft 1 on which a hollow sleeve 2 is fixed by suitable means, such as a cross pin 3 traversing an enlarged head 4 on the sleeve. A driving coupling member 5 is splined on the sleeve 2 as shown at 6, and is provided with inclined teeth 7 adapted to cooperate with similar teeth 8 on a driven coupling member 9 which is slidably journalled on the sleeve. A heavy compression spring 11, in the form of a plurality of elastic discs, is located between the driving coupling member 5 and the shoulder 12 formed by the head 4 on the sleeve 2, and a thrust ring 13 seated on the sleeve 2 within a counterbore 10 of the driven coupling 9 maintains the coupling members and spring under initial compression.

The driven coupling member 9 is provided with overrunning clutch teeth 14 cooperating with similar teeth 15 on a screw shaft 16 which is slidably journalled on the sleeve 2 and is yieldingly held in engagement with the driven coupling member 9 by means of a light compression spring 17 which bears against a stop ring 18 retained on the end of the sleeve 2 by a lock ring 19. A thrust washer 21 is preferably interposed between the end of the screw shaft and the spring 17.

A control nut 22 is threaded on the screw shaft 16 and is provided with lugs 23 slidably engaging in slots 24 in one end of a barrel member 25, the other end of which is rigidly connected as indicated at 26 with a pinion 27, slidably journalled on the power shaft for movement into and out of mesh with an engine gear 28.

The control nut 22 is retained in the barrel 25 by a lock ring 29, and a mesh enforcing spring 31 located between the control nut and a thimble 32 seated against a shoulder 33 in the barrel normally holds the control nut against the lock ring 29.

A centrifugal latch member 34 is mounted in the control nut for radial movement into and out of engagement with the screw shaft 16, and is yieldably held in engagement with the screw shaft by a spring 35. The screw shaft is provided with a notch 36 in which the latch 34 engages when the pinion and its associated parts have moved into meshed position so as to prevent demesh until a predetermined rotational speed has been attained.

Figure 2:
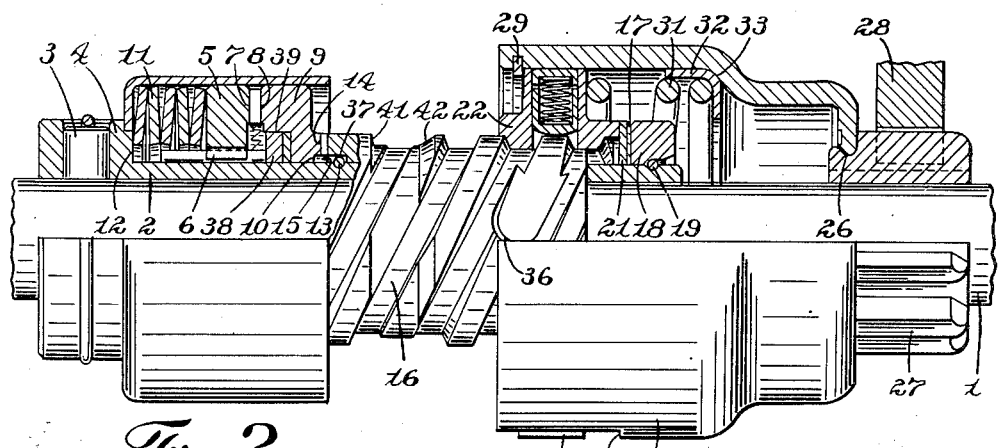
Fig. 2 is a similar view showing the parts in cranking position.

The meshing movement of the control nut is limited by its engagement with the washer 21, which at this time compresses the spring 17 flat against the stop ring 18 as shown in Fig. 2. Thereupon the screw-jack action of the screw shaft and control nut moves the screw shaft backward compressing the coupling members against the spring 11, this movement being permitted by a counterbore 37 in the screw shaft. This backward movement of the screw shaft is limited by one or more thrust rings 38 located in a counterbore 39 in the driven coupling member 9 in position to engage the ends of the splines 6 on the sleeve 2 and thereby limit the torque capacity of the coupling 5, 9.

In operation, starting with the parts in the positions illustrated in Fig. 1, rotation of the power shaft in the direction of the arrow $a$ is transmitted through the sleeve 2 and splines 6 to the driving coupling member 5, through the teeth 7, 8 to the driven coupling member 9, and through the overrunning clutch teeth 14, 15 to the screw shaft 16. The control nut 22 is thus traversed to the right, which movement is transmitted through the mesh-enforcing spring 31 and barrel 25 to the pinion 27 to move it into mesh with the engine gear 28. When the meshing movement of the control nut is arrested, the backward movement of the screw shaft 16 compresses the coupling 5, 9 against the spring 11, thus increasing the torque capacity of the coupling connection until the backward movement of the driven coupling member 9 is arrested by the engagement of the thrust ring 38 with the ends of the splines 6. Any excess torque developed during the deceleration of the parts as the cranking load is assumed by the pinion causes the coupling members to slip, thus limiting to torque to an amount determined by the stiffness of the spring 11 and the thickness of the thrust washers 38.

When the engine starts the acceleration of the pinion, barrel and control nut causes the control nut to thread itself back on the screw shaft, but this backward movement is arrested by the engagement of the latch 34 in the notch 36 in the screw shaft. At this time the pinion, barrel, control nut, and screw shaft, overrun the remaining parts of the drive, disengagement of the clutch teeth 14, 15 being permitted by compression of the spring 17. If the engine does not continue running, as soon as the rotational speed of the power shaft equals that of the pinion, the spring 17 causes the overrunning clutch teeth to reengage, and cranking is resumed.

When the engine becomes continuously self-operative, the rotational speed of the parts will cause centrifugal force to withdraw the latch 34 and permit the control nut with the barrel and pinion to thread itself back to its normal position against the shoulder 41 on the screw shaft, where it is yieldingly maintained by the engagement of the latch 34 against an inclined shoulder 42 on the screw shaft.

Although but one embodiment of the invention has been shown and described in detail, it will be understood that other embodiments are possible, and changes may be made in the design and arrangement of the parts without departing from the spirit of the invention.

I claim:

1. In an engine starter drive, a power shaft, a hollow sleeve fixed thereon, a driving coupling member splined on the sleeve having inclined driving teeth formed thereon, a driven coupling member slidably journalled on the sleeve having inclined teeth cooperating with the teeth of the driving coupling member, and also having overrunning clutch teeth, a screw shaft slidably journalled on the sleeve having overrunning clutch teeth cooperating with those of the driven coupling member, a pinion slidably journalled on the power shaft for movement into and out of mesh with an engine gear, a control nut threaded on the screw shaft, a barrel member anchored at one end to the pinion and connected at its other end for rotation and longitudinal movement with the control nut, stop means on the sleeve limiting the meshing movement of the control nut and screw shaft, and yielding means on the sleeve limiting the movement of the driving coupling member in the opposite direction.

2. An engine starter drive as set forth in claim 1 including further positive means for limiting the longitudinal movement of the driven coupling member in the demeshing direction.

3. An engine starter drive as set forth in claim 1 including further centrifugal latching means on the control nut and screw shaft preventing demesh of the pinion below a predetermined rotational speed.

4. In an engine starter drive a power shaft, a sleeve fixed thereon, a driving coupling member splined on the sleeve, a driven coupling member slidably journalled on the sleeve, a screw shaft clutched to the driven coupling member slidably journalled on the sleeve, a control nut threaded on the screw shaft, a pinion slidably journalled on the power shaft for movement into and out of mesh with a gear of the engine to be started, a barrel member connecting the control nut to the pinion, stop means on the sleeve limiting the meshing movement of the control nut, and a spring resisting longitudinal movement of the driving coupling member by the screw jack action of the screw shaft and control nut.

5. An engine starter drive as set forth in claim 4, including further means for positively limiting the longitudinal movement of the driven coupling member on the sleeve responsive to said screw-jack action of the control nut and screw shaft.

6. An engine starter drive as set forth in claim 4 including further a stop member on the sleeve cooperating with the driven coupling member to limit the expansion of said spring.

JAMES J. DIGBY.

No references cited.